(12) United States Patent
Philippe et al.

(10) Patent No.: US 8,253,609 B2
(45) Date of Patent: Aug. 28, 2012

(54) TRANSFORM-BASED CODING/DECODING, WITH ADAPTIVE WINDOWS

(75) Inventors: Pierrick Philippe, Melesse (FR); David Virette, Munich (DE)

(73) Assignee: France Telecom, Paris (FR)

( * ) Notice: Subject to any disclaimer, the term of this patent is extended or adjusted under 35 U.S.C. 154(b) by 102 days.

(21) Appl. No.: 12/809,666

(22) PCT Filed: Dec. 11, 2008

(86) PCT No.: PCT/FR2008/052286
§ 371 (c)(1),
(2), (4) Date: Jun. 21, 2010

(87) PCT Pub. No.: WO2009/081003
PCT Pub. Date: Jul. 2, 2009

(65) Prior Publication Data
US 2010/0283639 A1    Nov. 11, 2010

(30) Foreign Application Priority Data
Dec. 21, 2007    (FR) ..................................... 07 60258

(51) Int. Cl.
*H03M 7/34*    (2006.01)
(52) U.S. Cl. .................... 341/51; 341/50; 4/205; 4/230; 4/500; 4/501
(58) Field of Classification Search ........... 704/E19.001, 704/E19.006, E19.011, E19.019, E19.023, 704/203, 205, 229, 230, 500, 200.1, 269, 704/501; 341/50, 51
See application file for complete search history.

(56) References Cited

U.S. PATENT DOCUMENTS

| | | | | |
|---|---|---|---|---|
| 5,899,969 A * | 5/1999 | Fielder et al. | ................. | 704/225 |
| 5,903,872 A * | 5/1999 | Fielder | .......................... | 704/500 |
| 5,913,190 A * | 6/1999 | Fielder et al. | ................. | 704/229 |
| 6,963,842 B2 * | 11/2005 | Goodwin | ....................... | 704/500 |
| 7,313,519 B2 * | 12/2007 | Crockett | ....................... | 704/226 |
| 7,876,966 B2 * | 1/2011 | Ojanpera | ...................... | 382/232 |
| 2003/0088423 A1 * | 5/2003 | Nishio et al. | ................. | 704/500 |
| 2008/0080782 A1 * | 4/2008 | Olsson et al. | ................. | 382/266 |
| 2010/0076754 A1 * | 3/2010 | Kovesi et al. | ................. | 704/203 |

(Continued)

FOREIGN PATENT DOCUMENTS

WO        WO 91/16769 a1        10/1991
(Continued)

OTHER PUBLICATIONS

Edler, "Codierung von Audiosignalen mit überlappender Transformation und adaptiven Fensterfunktionen. Coding of Audio Signals with Overlapping Block Transform and Adaptive Window Functions," Frequenz, Schiele und Schon, Berlin, DE, vol. 43 (9), pp. 252-256 (Sep. 1, 1989).

(Continued)

*Primary Examiner* — Linh Nguyen
(74) *Attorney, Agent, or Firm* — Drinker Biddle & Reath LLP

(57) ABSTRACT

The present invention provides coding/decoding a digital signal, in particular using a transform with overlap employing weighting windows. In the invention, two consecutive and equal-size blocks of samples of the signal may be weighted by respective different successive windows. These two windows may be chosen independently of each other according to a criterion specific to the characteristics of the signal (entropy, data rate/distortion, etc.) that are determined for each of the two blocks.

19 Claims, 6 Drawing Sheets

U.S. PATENT DOCUMENTS

2010/0198586 A1* 8/2010 Edler et al. ............... 704/203
2010/0217607 A1* 8/2010 Neuendorf et al. ......... 704/500
2011/0173010 A1* 7/2011 Lecomte et al. ............ 704/500

FOREIGN PATENT DOCUMENTS

WO    WO 98/02971 A1    1/1998

OTHER PUBLICATIONS

Malvar, "Biorthogonal and Nonuniform Lapped Transforms for Transform Coding with Reduced Blocking and Ringing Artifacts," IEEE Transactions on Signal Processing, IEEE, New York, NY, US, vol. 46 (4), pp. 1043-1053 (Apr. 1, 1998).

Mochizuki et al., "Image coding using adaptive blocksize Princen-Bradley transform," Proceedings of the 1991 Conference on Visual Communication and Image Processing, Boston, Nov. 11-13, 1991, Spie, Bellingham, US, vol. 1605, pp. 434-444 (Nov. 11, 1991).

Princen et al., "Analysis/Synthesis Filter Bank Design Based on Time Domain Aliasing Cancellation," IEEE Transactions on Acoustics, Speech and Signal Processing, IEEE Inc., New York, vol., ASSP-34 (5), pp. 1153-1161 (Oct. 1, 1986).

Smart et al., "Filter Bank Design Based on Time Domain Aliasing Cancellation with Non-Identical Windows," Proceedings of the International Conference on Acoustics, Speech, and Signal Processing (ICASSP), Adelaide, Apr. 19-22, 1994, vol. iii, pp. III-185-III-188 (Apr. 19, 1994).

Xia et al., "Malvar Wavelets with Asymmetrically Overlapped Windows," IEEE Transactions on Signal Processing, IEEE, New York, NY, US, vol. 44 (3), pp. 723-728 (Mar. 1, 1996).

* cited by examiner

TRANSFORM-BASED CODING/DECODING, WITH ADAPTIVE WINDOWS

CROSS-REFERENCE TO RELATED APPLICATIONS

This application is the U.S. national phase of the International Patent Application No. PCT/FR2008/052286 filed Dec. 11, 2008, which claims the benefit of French Application No. 07 60258 filed Dec. 21, 2007, the entire content of which is incorporated herein by reference.

FIELD OF THE INVENTION

The present invention relates to the coding and decoding of digital signals.

BACKGROUND

To obtain a reduced bit rate in a transform-based coding scheme it is usual to attempt to reduce the accuracy devoted to the sample coding process, while ensuring minimum perceptible degradation. To this end, the reduction in quantization accuracy is controlled by using perceptive weightings. Based for example on known properties of the human eye (for video coding) or the human ear (for audio coding), this approach makes it possible to place the quantization noise in the frequency bands that are the least perceptible.

To use information from a psycho-visual or psycho-acoustic model, essentially in the frequency domain, it is standard practice to apply a time/frequency transform, quantization being effected in the frequency domain.

FIG. 1 is a diagram illustrating the structure of a transform-based coder, with:
- a bank BA of analysis filters FA1 to FAn receiving an input signal X;
- a quantization block Q (including band quantization modules Q1, . . . , Qn) followed by a coding block COD including coding modules COD1 to CODn; and
- a bank BS of synthesis filters FS1, . . . , FSn delivering the coded signal X'.

To reduce the bit rate further before transmission, the quantized frequency-domain samples are coded, often by an entropic (lossless) coding process. The quantization is effected by a uniform or non-uniform scalar quantizer or a vector quantizer, in the standard manner.

The noise introduced in the quantization step is shaped by the bank of synthesis filters (this process is known as applying an inverse transform). The inverse transform, which is linked to the analysis transform, must therefore be chosen to concentrate the quantization noise in the frequency or time domain to prevent it from becoming perceptible.

The analysis transform must concentrate the energy of the signal optimally in order to facilitate coding of the samples in the transformed domain. This process is referred to as energy compaction. In particular, the coding gain of the analysis transform, which depends on the input signal, must be maximized. An equation of the following type is used for this, in which K is a constant that can advantageously have the value 6.02 and R is the number of bits in each selected sample:

$$SNR = G_{TC} + K \cdot R \qquad (1)$$

Thus the signal/noise ratio (SNR) obtained is proportional to R plus the component $G_{TC}$ that represents the coding gain of the transform.

The higher the coding gain, the better the quality of reconstruction. The importance of the transform used for the coding process is therefore clear. It facilitates coding the samples, by means of its ability to concentrate both the energy of the signal (by means of the analysis part) and the quantization noise (by means of the synthesis part).

Audio and video signals being notoriously non-steady, the time-frequency transform must be adapted over time as a function of the nature of the input signal of the bank of filters.

A few applications to the usual coding techniques are described below.

With modulated transforms, the normalized audio coding techniques integrate banks of cosine-modulated filters that enable implementation of these coding techniques using fast algorithms based on cosine transforms or fast Fourier transforms.

The transform of this type most commonly used (in particular in MP3, MPEG-2, and MPEG-4 AAC coding) is the Modified Discrete Cosine Transform (MDCT), an expression for which is as follows:

$$X_k^t = \sum_{n=0}^{2M-1} x_{n+tM} p_k(n) \quad 0 \le k < M$$

in which:
M is the size of the transform;
$x_{n+tM}$ are the samples of the digitized signal with a period $$\frac{1}{F_e}$$

(the reciprocal of the sampling frequency) at time n+tM;
t is a frame index;
$X_k^t$ are the samples in the transformed domain for the frame t;

$$p_k(n) = h_a(n) C_{n,k} = \sqrt{\frac{2}{M}} \, h_a(n) \cos\left[\frac{\pi}{4M}(2n+1+M)(2k+1)\right]$$

is a basic function of the transform in which:
the term $h_a(n)$ is called the prototype filter or analysis weighting window and covers 2M samples; and
the term $C_{n,k}$ defines the modulation.

This transform is applied to audio processing. It is also applied to video processing, in particular in fixed image coding, where the transform is successively applied to the rows and the columns in the standard manner. This principle furthermore extends to signals with more than two dimensions.

To restore the initial time samples, the following inverse transform is applied on decoding in order to reconstitute the $0 \le n < M$ samples that are then situated in an area of overlap of two consecutive transforms. The decoded samples are then given by the following equation in which $p_k^s(n) = h_s(n) C_{n,k}$ defines the synthesis transform, the synthesis weighting window being denoted $h_s(n)$ and also covering 2M samples:

$$\hat{x}_{n+tM+M} = \sum_{k=0}^{M-1} \left[ X_k^{t+1} p_k^s(n) + X_k^t p_k^s(n+M) \right]$$

The reconstruction equation yielding the decoded samples may also be written in the following form:

$$\hat{x}_{n+tM+M} = \sum_{k=0}^{M-1} \left[ X_k^{t+1} h_s(n) C_{k,n} + X_k^t h_s(n+M) C_{k,n+M} \right]$$

$$= h_s(n) \sum_{k=0}^{M-1} X_k^{t+1} C_{k,n} + h_s(n+M) \sum_{k=0}^{M-1} X_k^t C_{k,n+M}$$

This other presentation of the reconstruction equation amounts to considering that two inverse cosine transforms may be applied successively to the samples $X_k^t$ and $X_k^{t+1}$ in the transform domain, their result then being combined by a weighting and addition operation. This reconstruction method is shown in FIG. 2 in which the samples in the transform domain are denoted $X_{t,k}$ and the reconstructed samples in the time domain are denoted $\hat{x}_n$.

An MDCT usually employs identical windows for analysis and synthesis and thus $h(n)=h_a(n)=h_s(n)$.

To ensure exact (referred to as perfect) reconstruction of the signal (subject to the condition $\hat{x}_{n+tM}=x_{n+tM}$, it is necessary to choose a prototype window $h(n)$ satisfying a few constraints.

The following equations are satisfactory for obtaining perfect reconstruction. They are usually adopted for constructing windows suited to the MDCT:

$$\begin{cases} h(2M-1-n) = h(n) \\ h^2(n) + h^2(n+M) = 1 \end{cases} \quad (2)$$

The windows are of even symmetry relative to a central sample, as shown in the examples in FIG. 3.

It is relatively simple to satisfy these simple constraints and, to this end, a standard prototype filter may consist of a sinusoidal window (shown in solid line in FIG. 3) that is written as follows:

$$h(n) = \sin\left[\frac{\pi}{2M}(n+0.5)\right]$$

Of course, other forms of prototype filter exist, such as the Kaiser-Bessel-derived (KBD) windows defined in the MPEG-4 standard (corresponding to the dashed-line curves in FIG. 3) and low-overlap windows.

Given the necessity to adapt the transform to the signal to be coded, the prior art techniques enable the transform that is used to be changed over time, with this being referred to below as window switching. It is considered here that on changing the transform, the size of the windows used remains the same so that only the weighting coefficients of the windows change over time.

The expressions given above for a constant window are adapted below to the situation of a change of window. Without loss of generality, overlapping involving only two consecutive frames for the MDCT, the transition for two consecutive frames $T_1$ and $T_2$ is explained as follows. The first frame $T_1$ uses an analysis window $h_{a1}$ and the second frame $T_2$ uses an analysis window $h_{a2}$. The synthesis windows used for reconstruction are chosen to be identical to the analysis windows in the overlapping parts of the two windows $h_{a1}$ and $h_{a2}$. Thus, for $0 \leq n < M$: $h_{a1}(n+M)=h_{s1}(n+M)$ $h_{a2}(n)=h_{s2}(n)$ Differing from the previous situation in which the same window is used for a plurality of successive frames, there is no longer a direct relationship between the first and second halves of the analysis windows, which means that the weighting coefficient $h_{a1}(n+M)$ can be independent of the coefficient $h_{a1}(n)$. Similarly, the coefficient $h_{a2}(n)$ can be independent of the coefficient $h_{a2}(n+M)$. Thus it is possible for the shape of the analysis window to be made to evolve over time.

The conditions for perfect reconstruction become, for $0 \leq n < M$:

$$\begin{cases} h_{a1}^2(n+M) + h_{a2}^2(n) = 1 \\ h_{a1}(2M-1-n) \cdot h_{a1}(n+M) - h_{a2}(M-1-n) \cdot h_{a2}(n) = 0 \end{cases}$$

The very simple standard solution for verifying the above conditions consists in choosing, for $0 \leq n < M$:

$h_{a1}(n+M)=h_{a2}(M-1-n)$

Accordingly, referring to FIG. 4, the analysis window used in the first half of the frame $T_2$ (the dashed-line curve in FIG. 4) is a mirror version of the analysis window used in the second half of the frame $T_1$ (the solid line curve in FIG. 4). In other words, to ensure perfect reconstruction, the prior art teaches progressive transitions via sections sharing the same analysis windows, apart from a mirror effect.

This mirror effect also applies to the synthesis windows by virtue of the imposed equality of the synthesis and analysis windows.

Because of the mirror effect, any insertion of zeros (weighting coefficients with the value 0) after the coefficient $h_{a1}(n+M)$ in the window $h_{a1}$ has the effect of inserting the same number of zeros at the beginning of the window $h_{a2}$ (in the term $h_{a2}(n)$). Moreover, this insertion of zeros implies imposing the same number of coefficients with the value 1 for the inverse ranks M−n. To be more precise:

$h_{a1}(n+M)=h_{a2}(M-1-n)$

Because of this, the general appearance of such a window including many zeros is similar to that of a rectangular window, as shown in FIG. 5. A rectangular window has poor resolution in the frequency domain and a high level of discontinuity. This is a first problem inherent to prior art coders/decoders.

In standardized known coders/decoders, the coder usually selects the transform to be used over time. Thus in the AAC standard, as described in the document "Information technology—Coding of audio-visual objects—Part 3: Audio", ISO/IEC 14496-3 (2001), the coder selects and sends the window shape corresponding to the second half of the analysis window, the first half being induced by the selection effected for the preceding frame. In the AAC standard, a bit is sent to the decoder in order to enable windows of the same type to be used for synthesis.

The decoder is therefore slaved to the coder and faithfully applies the types of window decided on by the coder.

It is therefore clear that a drawback of the prior art is that, in order to ensure a transition of the type of window that is used over time, it is necessary to introduce an interleaved half-window in order to ensure perfect reconstruction. Thus the analysis windows $h_{a1}$ and $h_{a2}$ referred to above cannot be rendered independent of each other on their common medium.

The present invention aims to improve on this situation.

SUMMARY

To this end the invention proposes a transition between windows with no restrictions in respect of consecutive windows.

To this end, the invention firstly provides a transform-based method of coding a digital signal with overlap using weighting windows, wherein two consecutive blocks of samples of the signal that are the same size 2M are weighted by a first analysis window and a second analysis window, respectively. These windows each contain a rising edge and a falling edge and the rising edge of the second window is different from the falling edge of the time-reversed first window.

This feature is clearly distinguished from the prior art described above and therefore manifests the fact that the first and second windows can be chosen completely independently of each other, for example according to a criterion appropriate to characteristics of the signal determined over each of the two blocks.

Thus at least two types of weighting window are provided, in particular for analysis on coding, and it is possible to change the weighting window type to code a current block in which a particular event has been detected, for example. That particular event is typically a change in the statistical behavior of the signal or the occurrence of a particular phenomenon, such as a large increase in the energy of the digital signal that the current frame contains.

These steps are repeated for the next block, so that it is possible, using the invention, to code a given block by applying a weighting window of a given type and to code a block that immediately follows the given block by directly applying another type of weighting window, without restrictions and in particular without the prior art restriction that necessarily imposes an interleaved window.

The above-mentioned blocks may correspond to signal frames, for example, as indicated above.

By offering the possibility of going directly from one type of window to another, without transition, the invention makes it possible to perform coding with windows adapted to each of the signals covered by these windows. An improved coding gain is thus obtained in each of the signal segments covered by the windows.

Compared to the prior art, improved coding quality is obtained through precise adaptation of the windows to the properties of the signal.

In a similar manner the present invention provides a transform-based method of decoding a digital signal with overlap using weighting windows, wherein two consecutive blocks of samples of the signal that are the same size are weighted by a first synthesis window and a second synthesis window, respectively, which each include a rising edge and a falling edge and in particular the rising edge of the second window is different from the falling edge of the time-reversed first window.

In one implementation of the present invention, the analysis windows of at least one of the above-mentioned two types of analysis window include at least one end portion including coefficients that are all zero. On decoding, the synthesis windows then include zeros at the start of the window. This makes it possible to reduce the coding/decoding delay linked to the transforms applied.

Thus the invention finds an advantageous application in interactive communications where it is important to minimize the delay.

BRIEF DESCRIPTION OF THE DRAWINGS

Other features and advantages of the invention become apparent on examining the following detailed description and the appended drawings in which, in addition to FIGS. 1 to 5 relating to the prior art and described above.

DETAILED DESCRIPTION

An implementation of the invention is described below that makes it possible to go from one analysis window to another without particular precautions and in particular with no transition window. Thus the analysis windows chosen on coding are independent of each other, which contributes to improving coding quality.

Considering a current frame $T_2$, it is assumed here that a particular choice of analysis window has already been made for an immediately preceding frame $T_1$. Another analysis window is chosen for the frame $T_2$ in order to facilitate coding the samples of the current frame $T_2$ in the frequency domain. For example, one possible criterion is that the window $h_{a2}$ chosen for the frame $T_2$ should maximize the coding gain in the transformed domain given by the following equation in which $\sigma_k^2$ represents an estimate of the variance of the transformed samples $X_k$:

$$G_{TC} = \frac{\frac{1}{M}\sum_{k=0}^{M-1}\sigma_k^2}{\left[\prod_{k=0}^{M-1}\sigma_k^2\right]^{1/M}}$$

Alternatively, a different criterion could be based on minimizing the entropy of the transformed samples, as expressed in the following form, for example:

$$J_H = -\sum_{k=0}^{M-1} X_k^2 \log[X_k^2]$$

It is possible to envisage a more complex criterion defining an optimum compromise between firstly the distortion after coding/decoding and secondly the bit rate required for that coding. This more complex criterion, which is to be minimized, can be written in the following form, for example, where $D(X)$ is a measurement of the distortion of the samples $X_k$ for a chosen bit rate; and $R(X)$ is that chosen bit rate:

$$J_{RD} = D(X) + \lambda R(X),$$

The best analysis window $h_{a2}$, according to the criterion finally adopted, is preferably determined in a restricted set of combinations. One constraint is still imposed in that the type of analysis filter used (notably the analysis prototype filter corresponding to the coding weighting window) must be known to the decoder and must therefore be sent to the decoder.

The window $h_{a2}$ may thus be chosen from a dictionary of analysis windows $\{h_0, h_1, h_2, \ldots, h_{Nb-1}\}$ where Nb represents the number of possible choices. There may then be provision for coding the index of the window shape chosen over an integer number of bits greater than or equal to $\log_2(Nb)$ and then sending that coded index to the decoder.

All the windows defined in this way can be applied for M samples, the analysis windows $h_{a1}$ and/or $h_{a2}$ of length 2M that are used being constructed as follows, for integers i and j between 0 and Nb−1 inclusive:

$$\begin{cases} h_{a1}(M+n) = h_i(n) \ 0 \le n < M \\ h_{a2}(n) = h_j(M-1-n) \ 0 \le n < M \end{cases}$$

Figure 1:
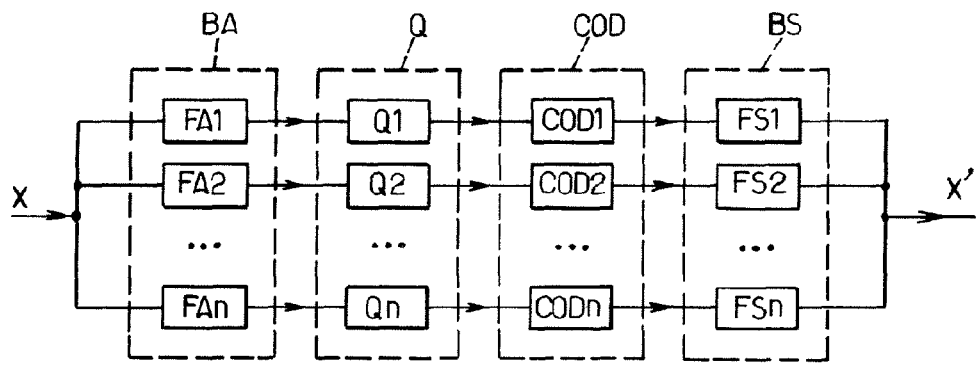
Figure 2:
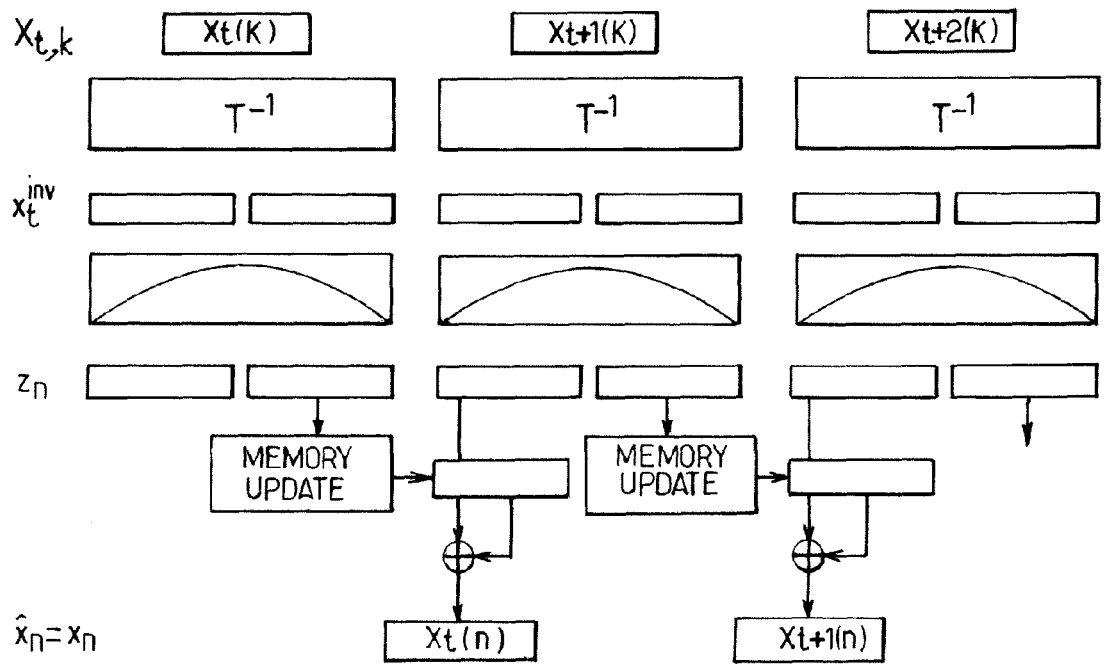
Figure 3:
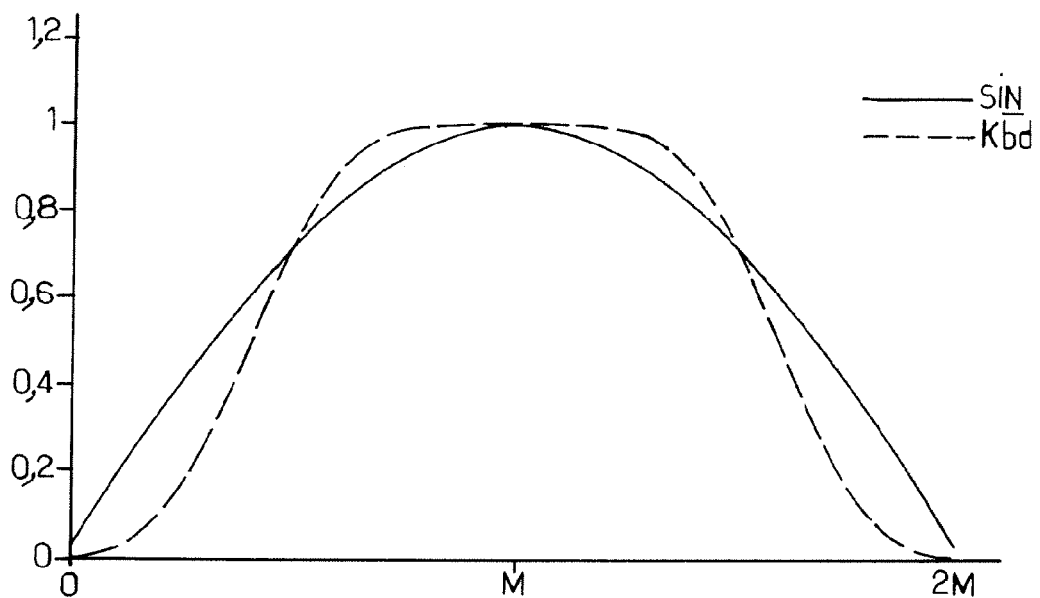
Figure 4:
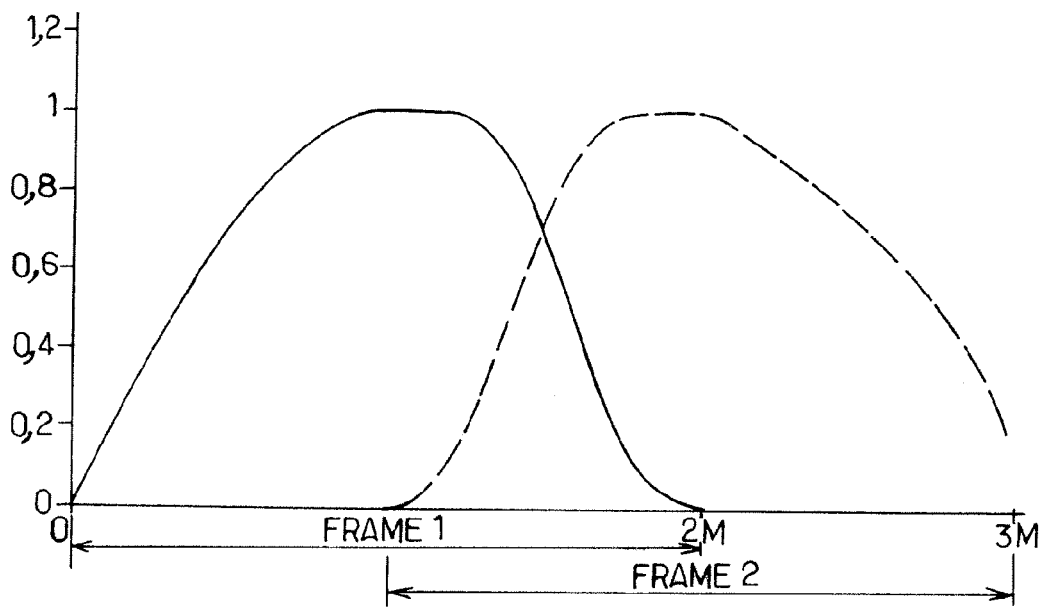

The windows $h_i$ and $h_j$ are constructed using, for example:
- KBD windows (dashed lines in FIG. 3) with parameters set to different shape coefficient values (often denoted α);
- sinusoidal windows;
- low-overlap (low-delay) windows as described in the AAC standard; or
- windows optimized in accordance with different criteria, for example according a coding gain criterion as described in "Bancs de Filtres et quantification vectorielle sur réseau—Etude conjointe pour la compression d'images", P. Onno, Université de Rennes 1 thesis (1996).

It is possible to restrict the choice of windows to a family of parameterable windows (such as KBD windows). In this situation all the parameters may be sent in coded form (which in the situation of KBD windows is restricted to a quantized and coded value of the form factor α).

On decoding, after reception of the type of analysis window $h_{a2}$ used for coding and after decoding the frequency-domain samples $X_k$ and then applying an inverse DCT transform, the synthesis windows must be applied in order to reconstitute the time samples. In order to limit how much the reconstructed signal is degraded, it is preferable to choose synthesis windows ensuring perfect reconstruction at the transform level. In the absence of quantization, an inverse transform following on from a direct transform does not lead to any distortion. Nevertheless the criterion adopted here is that the perceptibility of a transform reconstruction error relative to a predetermined perception threshold should remain negligible.

To reconstitute the common part between the frames $T_1$ and $T_2$ without distortion caused by transforms, the synthesis window portions affecting this common part ($h_{s2}(n)$ and $h_{s1}(n+M)$, with $0 \le n < M$, must be linked to the analysis windows over the same common part ($h_{a1}(n+M)$ and $h_{a2}(n)$). The following equation defines the conditions that must be complied with to ensure perfect reconstruction in this common part, for n=0 ... M−1:

$$\begin{cases} h_{a1}(n+M) \cdot h_{s1}(n+M) + h_{a2}(n) \cdot h_{s2}(n) = 1 \\ h_{a1}(2M-1-n) \cdot h_{s1}(n+M) - h_{a2}(M-1-n) \cdot h_{s2}(n) = 0 \end{cases}$$

Solving this system of equations for the windows $h_{s2}(n)$ and $h_{s1}(n+M)$, it is found that, subject to the condition $D(n) = h_{a1}(n+M) \cdot h_{a2}(M-1-n) + h_{a2}(n) \cdot h_{a1}(2M-1-n) \ne 0$:

$$\begin{cases} h_{s1}(n+M) = \dfrac{h_{a2}(M-1-n)}{D(n)} \\ h_{s2}(n) = \dfrac{h_{a1}(2M-1-n)}{D(n)} \end{cases}$$

This choice of synthesis windows $h_{s1}(n+M)$ and $h_{s2}(n)$ thus ensures perfect reconstruction.

Accordingly, on synthesis:
- the window $h_{s1}(n+M)$ is applied for the inverse MDCT applied to the second portion of the frame $T_1$; and
- the window $h_{s2}(n)$ is applied for the inverse MDCT applied to the first half of the frame $T_2$.

The result of the two weightings is summed term by term to obtain the decoded samples.

It is seen that the windows $h_{s1}(n+M)$ and $h_{s2}(n)$ are constructed simply by time reversal of the analysis windows followed by application of a correction factor $D'(n) = 1/D(n)$. Accordingly, the window $h_{s1}(n+M)$ is constructed by inverting the time indices of the analysis window $h_{a2}(n)$ and, reciprocally, the window $h_{s2}(n)$ is constructed by inverting the time indices of the analysis window $h_{a1}(n+M)$. The correction factor (corresponding to a gain to be applied to each of the windows) is defined by $D'(n) = 1/D(n)$. The expression time reversal or time index inversion refers here to defining the shape of a window as a function of the index (−n) equal and opposite to the current time index n.

A window of type $h_{a2}(M-1-n)$ may be applied to the second portion of the frame $T_1$ and a window of type $h_{a1}(2M-1-n)$ to the first half of the frame $T_2$. The result of this weighting is then summed and finally weighted by the weighting factor $D'(n) = 1/D(n)$.

A remarkable property is that the weighting factor $1/D(n)$ is a simple gain factor that corrects amplitude distortion. Thus the reconstruction operation using the windows $h_{a2}(M-1-n)$ and $h_{a1}(2M-1-n)$ yields a reconstructed signal stripped of time reversal components. The gain $D'(n)$ may thus be considered a simple amplitude correction term.

The expression for the gain $D(n)$ also indicates the following remarkable property: $D(n) = D(M-1-n)$, which is reflected in the fact that only M/2 gain coefficients $D(n)$ have to be calculated and/or stored. This property also applies for the gain $D'(n)$ on synthesis.

A first implementation may therefore store on coding all synthesis windows combining all possibilities of transition between analysis windows, i.e. the result of (with $D_{i,j}(n) = h_i(n+M) \cdot h_j(M-1-n) + h_j(n) \cdot h_i(2M-1-n)$):

$$\begin{cases} h_{s1,i,j}(n+M) = \dfrac{h_i(M-1-n)}{D_{i,j}(n)} \\ h_{s2,i,j}(n) = \dfrac{h_j(2M-1-n)}{D_{i,j}(n)} \end{cases}$$

This implementation then requires a great deal of memory.

A second implementation may store the analysis windows in the decoder, as they stand or with a time-reversed index. The gain $D_{i,j}(n)$, $0 \le n < M/2$ is then calculated, after which the time-reversed analysis windows are used for the reconstruction. Finally, the result obtained after addition is weighted by the gain $D'_{i,j}(n) = 1/D_{i,j}(n)$.

For some particular combinations of pairs (i, j), it may happen that for a set of samples n the gain $D_{i,j}(n) = 1$. In this particular situation, the final weighting may be dispensed with.

It is possible to extend this simplification to the situation where the gain $D_{i,j}(n)$ is very close to unity, in particular if the amplitude distortion to be corrected remains below 0.1 dB, for example, which in practice may be reflected in an absolute value difference between the gain $D_{i,j}(n)$ and unity below a selected threshold, for example 0.01.

In either of the above implementations, the gain functions $D_{i,j}(n)$ and their inverse functions $D'_{i,j}(n)$ may be calculated at the time of use or initially stored for use as and when required.

It should further be noted that the gain functions $D_{i,j}(n)$ require only M/2 storage elements for each pair (i, j). Moreover, not all combinations need to be stored, as $D_{i,j}(n) = D_{j,i}(n)$ whatever the pair (i, j).

An advantageous implementation of the invention applied to delay reduction is described below.

Figure 7:
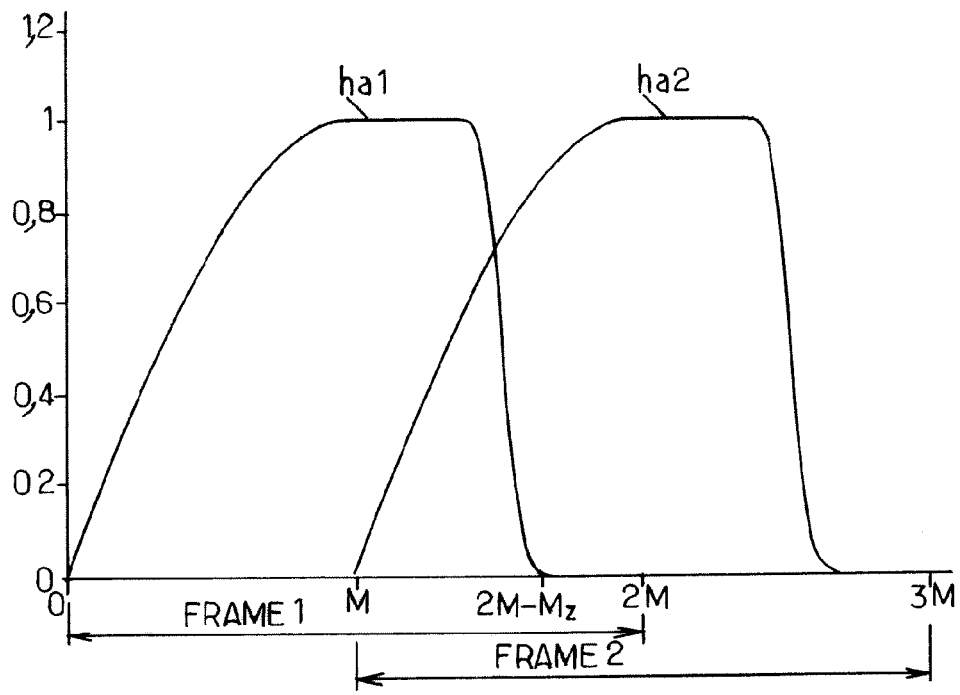
FIG. 7 shows, in an advantageous implementation of the present invention, analysis windows including NI, zero coefficients at the end of the window.

In this particular implementation, integer portions of weighting windows (contiguous values of weighting coefficients) at zero are imposed in the analysis window $h_{a1}(n+M)$. More particularly, the window $h_{a1}(n+M)$ contains a portion of $M_z$ zeros in the range $2M-M_z \leq n < 2M$ with $M_z < M/2$, as shown in FIG. 7, which in this implementation represents two typical windows.

In the first implementation, and as opposed to the prior art, the windows $h_{a1}$ and $h_{a2}$ are independent of each other in the range between M and 2M inclusive. The only condition as to the choice of the windows $h_{a1}$ and $h_{a2}$ is that the value $D(n)$ must not be zero for $0 \leq n < M$. This particular construction of the window $h_{a1}(n+M)$ ensures that the synthesis window $h_{s2}(n)$ can contain zeros between 0 and $M_z-1$. This result follows from the following equation:

$$h_{s2}(n) = \frac{h_{a1}(2M-1-n)}{D(n)}$$

It is therefore clear that, for the same asymmetrical window $h_{a1}$ as used for analysis, the number $M_z$ of zero coefficients must satisfy the condition $M_z < M/2$ to comply with the condition on the gain $D(n)$ given by the following equation:

$$D(n) = h_{a1}(n+M) \cdot h_{a1}(M-1-n) + h_{a1}(n) \cdot h_{a1}(2M-1-n) \neq 0$$

This setting a portion of the analysis window $h_{a1}(n+M)$ to zero has an advantageous effect on the sample reconstruction delay, as described below.

Figure 8:
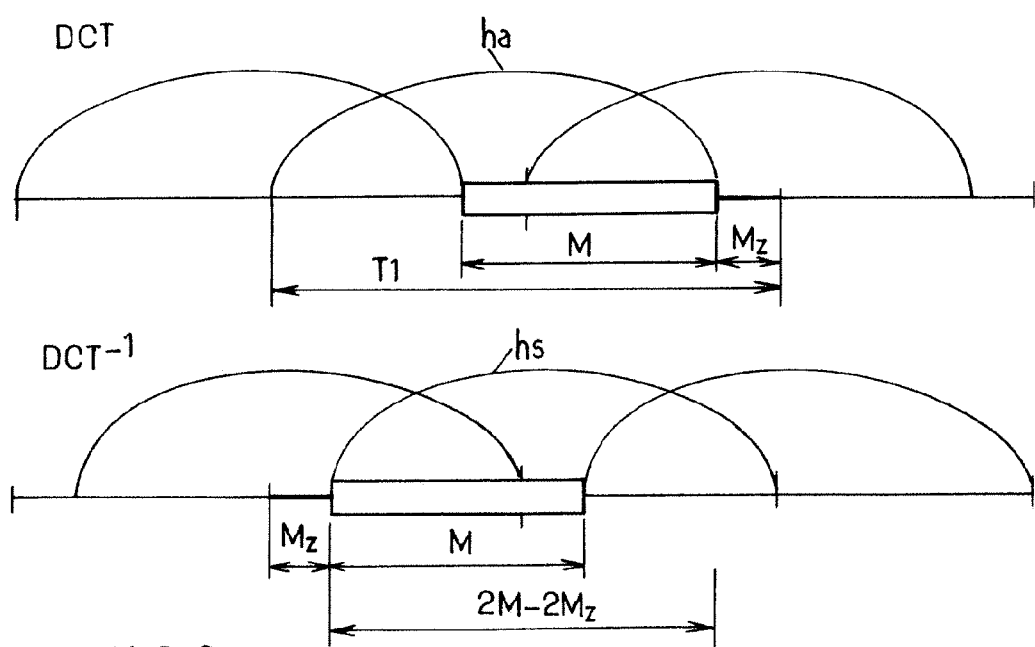
FIG. 8 shows the reduction of the coding/decoding delay that this advantageous implementation achieves.

Referring to FIG. 8, the frame T1 (which has a size of 2M samples) is processed by applying the window $h_{a1}$. The result of this weighting is processed by the DCT. Because the window $h_{a1}$ contains zeros, the frame T1 can simply be coded and sent at the end of $2M-M_z$ samples. It is not necessary to wait for the end of the 2M samples of the frame T1 to send the corresponding coded frame, but merely to wait for the processing of its first $2M-M_z$ samples. Compared to the use of a prior art standard window, this represents an advance corresponding to the time taken to process $M_z$ samples of the end of the frame T1.

On synthesis, the similar synthesis window $h_{s1}$ includes $M_z$ first coefficients at zero (no longer at the end of the window, but now at the start of the window), which, in the same way, makes it possible to reconstruct the decoded samples with an advance of $M_z$ samples. The $M_z$ samples corresponding to the start of the synthesis window are reconstituted in reality by the preceding window $h_{s0}$ from FIG. 8, because the start of the window $h_{s1}$ has no effect. Thus it is again unnecessary to wait for the subsequent samples after the inverse DCT to reconstruct the $M_z$ decoded samples efficiently, which on synthesis results in a further advance of $M_z$ samples.

Thus imposing $M_z$ successive zero coefficients at the end of the analysis window makes it possible to reduce the delay caused by the direct MDCT and then inverse $MDCT^{-1}$ processing of $2M_z$ samples. The total delay is thus $2M-2M_z$ samples. This delay reduction is achieved with windows having an effective length of $2M-M_z$, whereas a prior art solution would teach in the standard way analysis and synthesis windows that for the same delay reduction are identical (apart from the time reversal) and have an effective length of $2M-2M_z$. Thus by means of this implementation longer windows can be used and the frequency responses obtained are therefore more advantageous and coding quality is improved.

Figure 5:
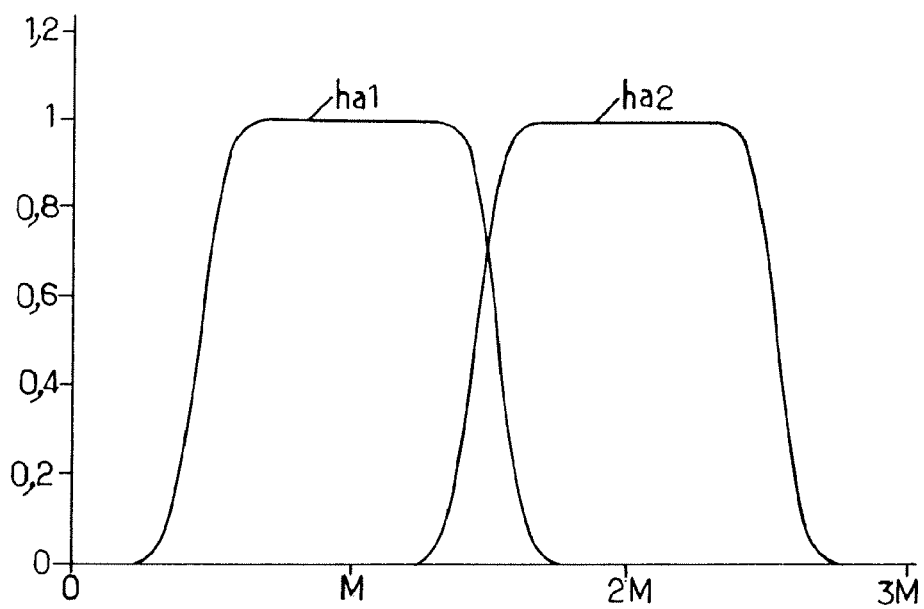
Figure 6:
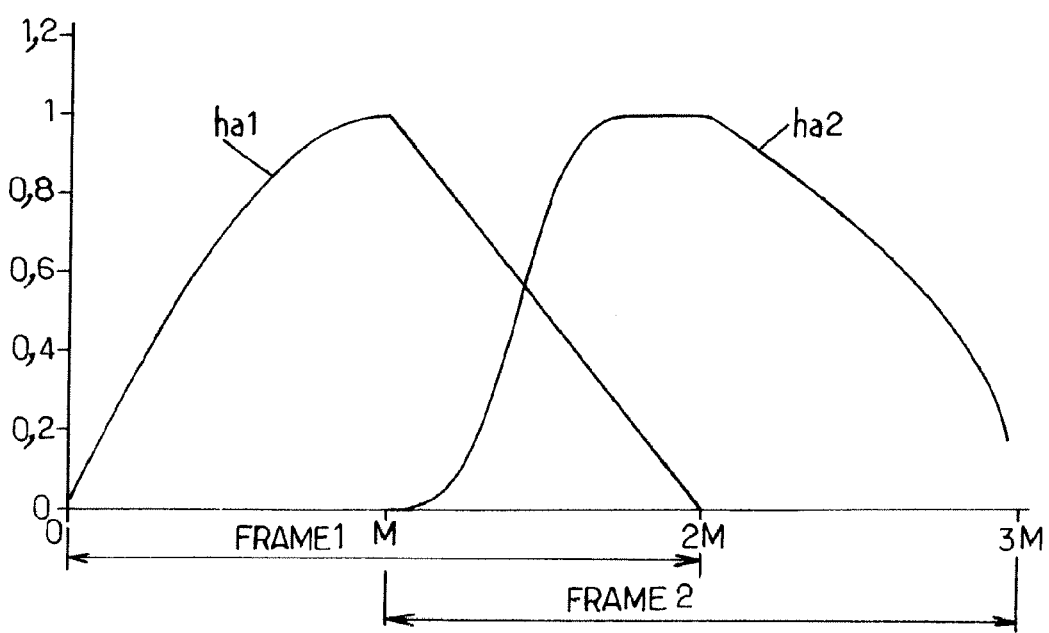
FIG. 6 shows a change of window type, with first and second windows of the invention having different shapes.

Although the prior art imposes a value of 1 on the central coefficients of the weighting windows if zeros are introduced at the end or start of a window, which penalizes the coding properties with this type of window (FIG. 5), the invention is free of this drawback. Moreover, as there is no constraint on the choice of the successive analysis windows, satisfactory coding properties may be obtained.

Thus an analysis transform better suited than others to the signal to be coded could be selected from analysis filters containing zeros at their end (for example in a dictionary of prototype filters), leading to optimum signal coding/decoding and to a delay reduced by $2M_z$ compared to the prior art.

One particular implementation of the invention is described below in which a pair of windows $h_{a1}$ and $h_{a2}$ is chosen for coding that makes it possible to avoid a correction $D'(n)$ on synthesis. Here it is a question of significantly modifying an initial analysis window to guarantee on synthesis a weighting function $D'(n)$ that is constant and equal to unity.

To this end, two analysis window portions are determined on the basis of a window $h(n)$ defined over the range $0 \leq n < 2M$ and satisfying for any index n a non-zero normalization factor $\Delta(n)$, with $0 \leq n < M$:

$$\Delta(n) = \sqrt{h(n)h(2M-1-n) + h(n+M)h(M-1-n)} \neq 0$$

There are then constructed, for $0 \leq n < M$:

$$h_{a1}(n+M) = h(n+M)/\Delta(n) \text{ and } h_{a2}(n) = h(n)/\Delta(n)$$

In this way, the gain $D'(n)$ on decoding is unity for any n and the reconstruction on synthesis is effected by weighting by the same but time-reversed analysis windows $h_{a1}$ and $h_{a2}$, this weighting being followed by simple addition.

One example of a window $h(n)$ for $0 \leq n < 2M$ containing $M_z$ zeros and making it possible to limit the delay of $2M_z$ samples for $0 \leq n < 2M - M_z$ is:

$$h(n) = \sin\left[\frac{\pi}{2M-M_z}\left(n+\frac{1}{2}\right)\right]$$

Otherwise, i.e. for $2M-M_z \leq n < 2M$: $h(n)=0$

Another possible choice that enables frequency selectivity varying in accordance with a form parameter a consists in a Kaiser-Bessel window defined as follows for $0 \leq n < M - M_z/2$:

$$h(n, \alpha) = \frac{I_0\left[\pi\alpha\sqrt{1-\left(\frac{n-M'}{M'}\right)^2}\right]}{I_0[\pi\alpha]}, \text{ with } M' = M - M_z/2,$$

where $h(2M-M_z-1-n, \alpha) = h(n, \alpha)$ for $0 \leq n < M-M_z/2$; and $h(n, \alpha) = 0$ otherwise (for n such that $2M-M_z \leq n < 2M$).

It is seen that it is therefore possible to determine the analysis windows $h_{a1}$ and $h_{a2}$ from a chosen initialization window $h(n)$ and thence to determine the synthesis windows simply by time reversal.

To implement decoding by the invention it is also possible to determine the two synthesis window portions $h_{s1}$ and $h_{s2}$ directly from an initialization window $h(n)$ containing $M_z$ zero coefficients at the start of the window.

Based on a sinusoidal initialization window (the solid line curve in FIG. 11) such that for $0 \leq n < M_z$:
$h(n)=0$ and
for $0 \leq n < 2M - M_z$:

$$h(n+M_z) = \sin\left[\frac{\pi}{2M-M_z}\left(n+\frac{1}{2}\right)\right]$$

The synthesis window portions $h_{s1}$ and $h_{s2}$ are then deduced directly, as follows:

$$h_{s1}(n+M) = h(n+M)/\Delta(n)$$

$$h_{s2}(n) = h(n)/\Delta(n) \quad 0 \leq n < M$$

As previously, for $0 \leq n < M$:

$$\Delta(n) = \sqrt{h(n)h(2M-1-n) + h(n+M)h(M-1-n)} \neq 0$$

Figure 11:
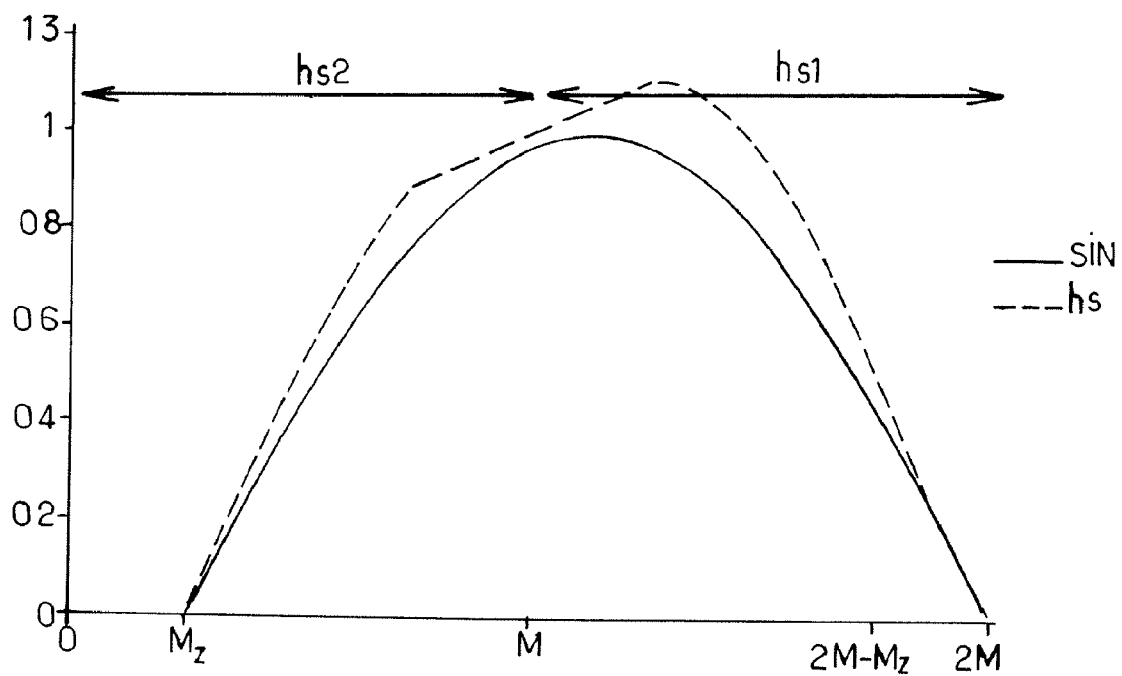
FIG. 11 shows (in dashed line) an advantageous synthesis window shape.

FIG. 11 shows in dashed line the shape of an overall synthesis window $h_{si}$ resulting from the two window portions $h_{s1}$ and $h_{s2}$ obtained from the sinusoidally expressed initialization window h(n) shown in solid line in this implementation.

Figure 9:
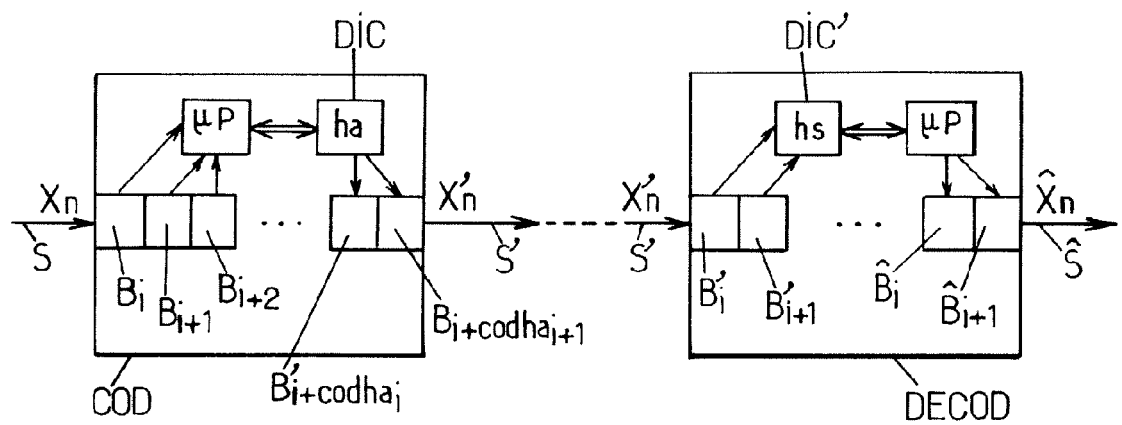
FIG. 9 shows a coding/decoding system of the invention.

An implementation of the present invention described here by way of example also provides a coding/decoding system as shown in FIG. 9. A coder COD receives a digital signal S to be coded including a succession of samples $X_n$. This succession of samples is processed in successive blocks $B_i$, $B_{i+1}$, etc. each of 2M samples (step 101, FIG. 10A). Processing means µP of the coder analyze the content of the blocks $B_i$ one by one (step 102, FIG. 10A), for example in accordance with a given criterion (entropy, coding gain, distortion/bit rate, etc.) and deduce the analysis window $ha_i$ from this using a dictionary DIC of the coder, which window is the best suited to this block $B_i$ according to the above-mentioned criterion. The analysis weighting window $ha_i$ chosen in this way is applied to the current block $B_i$ (step 103, FIG. 10A), which is then coded (step 104).

Figure 10A:
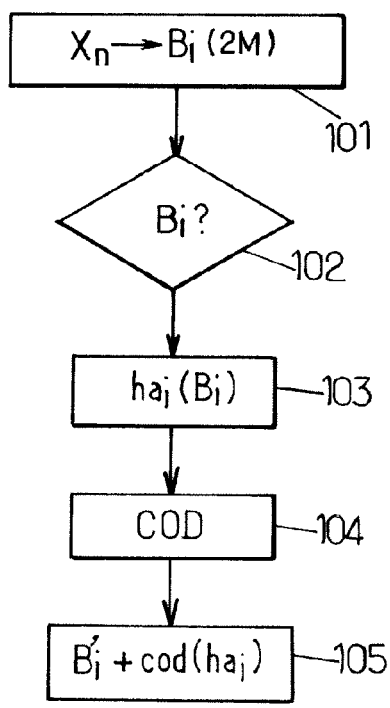
FIG. 10A shows the steps of a coding method of the invention.
Figure 10B:
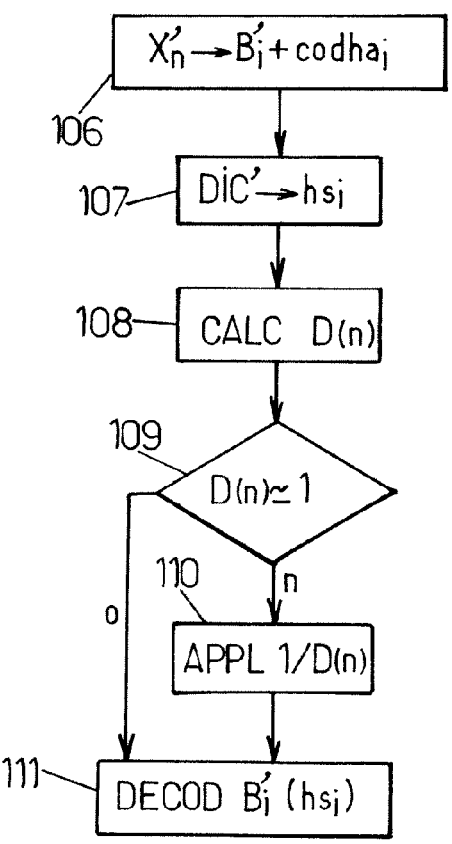
FIG. 10B shows the steps of a decoding method.

A block $B'_i$ resulting from this coding is then sent to the decoder DECOD from FIG. 9 in the coded signal S', with a code in the dictionary DIC of the selected analysis window $ha_i$ (step 105, FIG. 10A). Of course, the decoder DECOD has received with a previous block $B'_{i-1}$ a code from the dictionary DIC designating a previously used analysis window $ha_{i-1}$. On reception of the coded signal S' including a succession of coded blocks $B'_i$, $B'_{i+1}$, etc. and window codes $ha_i$ used for the analysis in the coding of the blocks $B_i$ (step 106, FIG. 10B), the decoder DECOD determines from its own dictionary DIC' (similar to the dictionary DIC of the coder) the half-windows $hs_{i-1}(n+M)$ and $hs_i(n)$ to be used for synthesis (step 107).

In the example described here, the processing means µP of the decoder DECOD estimate the correction factor D(n) for each time index n linked with the window $ha_{i-1}$ used previously in the analysis (step 108). If the correction factor is close to 1 (for example with an absolute value threshold of 0.1 dB), in the FIG. 10B test 109 the decoder applies no correction (y arrow on exit from the test 109). Otherwise (n arrow), the processing means µP apply the correction D'(n)=1/D(n) described above (step 110). The processing continues with the decoding as such of the blocks $B'_i$ weighted with the windows $hs_i$ (where appropriate corrected by the factor D') in the step 111, to deliver decoded blocks $\hat{B}_i$, $\hat{B}_{i+1}$, etc. of the decoded signal $\hat{S}$ the (lossless) samples $\hat{X}_n$ of which have the values of the initial samples $X_n$ since perfect reconstruction is achieved.

The present invention also provides a coder COD of the type represented in FIG. 9, as well as a computer program intended to be stored in of memory of such a coder and an algorithm that may be as represented by the FIG. 10A flowchart. It further provides a decoder DECOD of the type represented in FIG. 9 as well as a computer program intended to be stored in of memory of such a decoder and an algorithm that may be as represented by the FIG. 10B flowchart.

The invention claimed is:

1. A transform-based method of coding a digital signal with overlap using weighting windows,
wherein two consecutive blocks of samples of the signal that are of a same size are weighted by a first analysis window and a second analysis window, respectively, and, said first and second windows comprising each a rising edge and a falling edge, the rising edge of the second window is different from the falling edge of the time-reversed first window.

2. The coding method according to claim 1, wherein said first and second windows are chosen independently of each other according to a criterion specific to characteristics of the signal determined over each of the two blocks.

3. The coding method according to claim 2, wherein the criterion for choosing a weighting window is one of or a combination of the following:
 maximized coding gain;
 minimized entropy of the transformed samples; and
 optimized trade-off between the distortion caused by coding/decoding and the bit rate required for said coding.

4. The coding method according to claim 1, wherein each weighting window chosen for coding a block is selected in a dictionary of possible weighting windows, a window index being associated with each window from said dictionary, and the index of the selected window is sent to a decoder for decoding a window similar to the window selected for coding.

5. The coding method according to claim 1, wherein at least some of the analysis windows contain a chosen number of successive weighting coefficients of value zero at the end of the window and said chosen number of zero coefficients is less than one quarter of the total number of coefficients of a window.

6. A transform-based method of decoding a digital signal with overlap using weighting windows,
wherein two consecutive blocks of samples of the signal that are the same size are weighted by a first synthesis window and a second synthesis window, respectively,
and wherein, said first and second windows comprising each a rising edge and a falling edge, the rising edge of the second window is different from the falling edge of the time-reversed first window.

7. The decoding method according to claim 6, wherein information on the analysis windows used successively for coding is received from a coder and said first and second synthesis windows are deduced from the first and second analysis windows used successively for coding, the first and respectively the second synthesis window being deduced from the second and respectively the first analysis window by reversing the temporal positions of weighting coefficients of the second and respectively the first analysis window and by applying a correction factor to each weighting coefficient of the second and respectively the first analysis window.

8. The decoding method according to claim 7, wherein the first synthesis window and the second synthesis window are deduced from the first and second analysis windows, respectively, using equations of the following type:

$$\begin{cases} h_{s1}(n+M) = \dfrac{h_{a2}(M-1-n)}{D(n)} \\ h_{s2}(n) = \dfrac{h_{a1}(2M-1-n)}{D(n)} \end{cases}$$

wherein:
 the number M is such that a block of samples includes 2M samples;
 n is a temporal position index between 0 and M−1 inclusive;
 h(n) designates the weighting coefficient of the window h with temporal position index n;

−n designates equal and opposite to the index n, manifesting said temporal position inversion; and D(n) designates said correction factor to be applied to a temporal position coefficient n, which factor is non-zero for n between 0 and M−1 inclusive and is given by the equation:

$$D(n) = h_{a1}(n+M) \cdot h_{a2}(M-1-n) + h_{a2}(n) \cdot h_{a1}(2M-1-n).$$

9. The decoding method according to claim 7, wherein the information on the analysis windows consists of indices from a dictionary of windows used for coding and there is provided for decoding a similar dictionary comprising synthesis windows that are similar to the analysis windows used for coding and have been pre-corrected by said correction factor, each window from the similar dictionary having a dictionary index that can be determined from said analysis window index sent to the decoder.

10. The decoding method according to claim 7, wherein the information on the analysis windows consists of indices from a dictionary of windows used for coding and there is provided for decoding the same dictionary comprising respective windows obtained from prototype filters of a bank of analysis filters for coding, and wherein, for decoding, there are applied:

temporal position inversion; and application of said correction factor to the coefficients of a window from the dictionary if the estimated correction factor for a coefficient is substantially different from unity to within a predetermined threshold.

11. The decoding method according to claim 6, wherein at least some of the synthesis windows include a chosen number of successive weighting coefficients of zero value at the start of the window and said chosen number of zero coefficients is less than one quarter of the total number of coefficients of a window.

12. The decoding method according to claim 11, comprising a synthesis operation using a weighting window corresponding to two time-reversed analysis window portions, wherein weighting by the synthesis window is effected by means of an addition, said analysis window portions are expressed as a function of an initialization window h(n) by expressions of the type $h_{a1}(n+M) = h(n+M)/\Delta(n)$ and $h_{a2}(n) = h(n)/\Delta(n)$, where the number M is such that a block comprises 2M samples, n is a temporal index such that $0 \leq n < M$, and $\Delta(n)$ is a non-zero normalization factor defined for any index n such that $0 \leq n < M$.

13. The decoding method according to claim 11, wherein two synthesis window portions are determined directly from an initialization window h(n) containing at its start a number of zero coefficients chosen in accordance with expressions of the type $h_{s1}(n+M) = h(n+M)/\Delta(n)$ and $h_{s2}(n) = h(n)/\Delta(n)$, $0 \leq n < M$, where the number M is such that a block comprises 2M samples, n is a temporal index such that $0 \leq n < M$, and $\Delta(n)$ is a non-zero normalization factor defined for any index n such that $0 \leq n < M$.

14. The method according to claim 12, wherein said normalization factor is defined by an expression of the type:

$$\Delta(n) = \sqrt{h(n)h(2M-1-n) + h(n+M)h(M-1-n)}.$$

15. The method according to claim 13, wherein the initialization window h(n) is expressed by the following equation, in which $M_z$ is said chosen number of zero coefficients at the start of the initialization window:

$$h(n) = 0 \text{ for } 0 \leq n < M_z; \text{ and}$$

$$h(n + M_z) = \sin\left[\frac{\pi}{2M - M_z}\left(n + \frac{1}{2}\right)\right] \text{ for } 0 \leq n < 2M - M_z.$$

16. A device for transform-based coding of a digital signal with overlap using weighting windows, comprising means for implementing the method according to claim 1.

17. A device for transform-based decoding of a digital signal with overlap using weighting windows, comprising instructions for implementing the method according to claim 6.

18. A non-transitory computer readable medium storing a program product in the form of computer code, wherein said program product comprises instructions for implementing the coding method according to claim 1, when the instructions are executed by a processor of the device.

19. A non-transitory computer readable medium storing a program product in the form of computer code, wherein said program product comprises instructions for implementing the decoding method according to claim 6 when the instructions are executed by a processor of the device.

\* \* \* \* \*